(12) United States Patent
Wang et al.

(10) Patent No.: US 12,706,542 B2
(45) Date of Patent: Aug. 11, 2026

(54) TRANSFORMER IMPEDANCE BALANCED CIRCUIT FOR POWER CONVERTERS

(71) Applicant: University of Florida Research Foundation, Incorporated, Gainesville, FL (US)

(72) Inventors: Shuo Wang, Gainesville, FL (US); Qinghui Huang, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 244 days.

(21) Appl. No.: 18/742,232

(22) Filed: Jun. 13, 2024

(65) Prior Publication Data

US 2025/0007413 A1 Jan. 2, 2025

Related U.S. Application Data

(60) Provisional application No. 63/510,691, filed on Jun. 28, 2023.

(51) Int. Cl.
*H02M 3/335* (2006.01)
*H02M 1/44* (2007.01)

(52) U.S. Cl.
CPC ......... *H02M 3/33573* (2021.05); *H02M 1/44* (2013.01)

(58) Field of Classification Search
CPC ............................ H02M 3/33573; H02M 1/44
USPC ............................................................ 363/13
See application file for complete search history.

(56) References Cited

U.S. PATENT DOCUMENTS

| | | | | |
|---|---|---|---|---|
| 9,502,987 | B1 * | 11/2016 | Feno | H02M 3/33546 |
| 2015/0162837 | A1 * | 6/2015 | Duan | H02M 3/33569 363/21.14 |
| 2015/0372607 | A1 * | 12/2015 | Hung | H02M 3/33576 363/21.02 |
| 2018/0076725 | A1 * | 3/2018 | Xue | H02M 3/01 |
| 2022/0376607 | A1 * | 11/2022 | Ye | H02M 1/123 |

* cited by examiner

*Primary Examiner* — Yemane Mehari
(74) *Attorney, Agent, or Firm* — Alston & Bird LLP

(57) ABSTRACT

Impedance balancing of isolated converters to reduce common mode (CM) electromagnetic interference (EMI) noise over a wide frequency range. An impedance balanced isolator converter circuit comprises a plurality of resistor, inductor, and capacitor (RLC) branches (i) that are representative of a transformer circuit component, (ii) that are coupled in series with a plurality of respective noise source voltages, and (iii) comprise RLC parameters that are based on respective ones of a plurality of impedances associated with the transformer circuit component; a load impedance branch (i) that is representative of one or more transformer primary side circuit components and (ii) that is coupled in parallel with the plurality of RLC branches and the plurality of respective noise source voltages; and an RLC balance branch coupled in parallel with a first resistor, a first inductor, and a first capacitor that are associated with a first of the plurality of RLC branches.

20 Claims, 21 Drawing Sheets

200

TRANSFORMER IMPEDANCE BALANCED CIRCUIT FOR POWER CONVERTERS

CROSS REFERENCE TO RELATED APPLICATION

This application claims the priority of U.S. Provisional Application No. 63/510,691, entitled "TRANSFORMER IMPEDANCE BALANCED CIRCUIT FOR POWER CONVERTERS," filed on Jun. 28, 2023, the disclosure of which is hereby incorporated by reference in its entirety.

TECHNICAL FIELD

Various embodiments of the present disclosure relate to transformer circuits, and more particularly to resistor, inductor, and capacitor impedance balanced circuits that reduce common mode electromagnetic interference noise at high frequencies.

BACKGROUND

Isolated converters are widely applied in applications that require galvanic isolation, such as portable electronics adapters, medical power supplies, chargers of electrical vehicles, and data center power supplies. Transformers are used in isolated direct current to direct current (DC-DC) converters to isolate input and output ground connections to meet safety requirements. Transformer may also help to achieve a large step-up or step-down conversion ratio. Multiple output voltages may be achieved via multiple transformers, secondary windings, and multiple converter secondary circuits. However, common mode (CM) noise may result from high rates of voltage changes over time that result from fast-switching action of power devices. In particular, interwinding capacitance of a transformer may provide the main propagation of CM noise, especially when the secondary side of the transformer is grounded for safety concerns.

Electromagnetic interference (EMI) filters may be used in isolated converters to reduce CM noise caused by transformers. However, existing designs of EMI filters comprise bulky designs that require excessive components that add to the size and cost of converters. Applicant has identified many technical challenges and difficulties associated with conventional EMI filters.

BRIEF SUMMARY

Various embodiments described herein relate to resistor, inductor, and capacitor (RLC) impedance balancing of isolated converters to reduce common mode (CM) electromagnetic interference (EMI) noise over a wide frequency range.

According to some embodiments, an impedance balanced isolator converter circuit comprises a plurality of resistor, inductor, and capacitor (RLC) branches (i) that are representative of a transformer circuit component, (ii) that are coupled in series with a plurality of respective noise source voltages, and (iii) comprise RLC parameters that are based on respective ones of a plurality of impedances associated with the transformer circuit component; a load impedance branch (i) that is representative of one or more transformer primary side circuit components and (ii) that is coupled in parallel with the plurality of RLC branches and the plurality of respective noise source voltages; and an RLC balance branch coupled in parallel with a first resistor, a first inductor, and a first capacitor that are associated with a first of the plurality of RLC branches.

In some embodiments, the RLC balance branch comprises a serial resonant frequency of the first of the plurality of RLC branches. In some embodiments, the transformer is applied in one or more of a forward converter, a two inductors and a capacitor (LLC) converter, a full-bridge converter, or a push-pull converter. In some embodiments, the first of the plurality of RLC branches comprises a first capacitance that is less than a second capacitance of a second of the plurality of RLC branches. In some embodiments, the RLC balance branch comprises a balance capacitance equal to a difference between a second capacitance associated with a second of the plurality of RLC branches and a first capacitance associated with the first of the plurality of RLC branches.

According to some embodiments, a computer-implemented method comprises generating a reduced power converter circuit model based on an input power converter circuit model; generating an impedance circuit model based on the reduced power converter circuit model; generating an impedance balanced circuit model based on the impedance circuit model; and generating a resistor, inductor, and capacitor (RLC) impedance balanced circuit model based on the impedance balanced circuit model.

In some embodiments, generating the reduced power converter circuit model comprises replacing one or more non-linear devices of the input power converter circuit model with one or more power sources. In some embodiments, generating the reduced power converter circuit model further comprises removing given ones of the one or more power sources that do not contribute to common mode electromagnetic interference noise. In some embodiments, generating the impedance circuit model comprises converting a transformer component in the reduced power converter circuit model into a set of parallel transformer impedance branches, wherein a transformer impedance branch (i) comprises a transformer impedance and (ii) is coupled in series with a noise source voltage. In some embodiments, generating the impedance circuit model comprises converting one or more transformer primary side circuit components in the reduced power converter circuit model into a load impedance branch that comprises a load impedance. In some embodiments, generating the impedance balanced circuit model comprises coupling a balance impedance branch that comprises a balance impedance to each transformer impedance branch in the impedance circuit model. In some embodiments, generating the impedance balanced circuit model comprises coupling, for each transformer impedance branch in the impedance circuit model, a balance impedance to the transformer impedance such that a plurality of transformer impedance-balance impedance pairs that result from the coupling comprise substantially similar total impedance values for a desired frequency range. In some embodiments, generating the RLC impedance balanced circuit model comprises (i) converting a plurality of transformer impedances of the impedance balanced circuit model into a plurality of respective RLC branches; and (ii) replacing an entirety of balance impedances of the impedance balanced circuit model with an RLC balance branch that comprises a same serial resonant frequency as the plurality of transformer impedances. In some embodiments, the computer-implemented method further comprises coupling the RLC balance branch in parallel with a first resistor, a first inductor, and a first capacitor that are associated with one of the plurality of RLC branches that comprises a lowest capacitance.

According to some embodiments, one or more non-transitory computer-readable storage media including instructions that, when executed by one or more processors, cause the one or more processors to generate a reduced power converter circuit model based on an input power converter circuit model; generate an impedance circuit model based on the reduced power converter circuit model; generate an impedance balanced circuit model based on the impedance circuit model; and generate a resistor, inductor, and capacitor (RLC) impedance balanced circuit model based on the impedance balanced circuit model.

In some embodiments, the one or more non-transitory computer-readable storage media further includes instructions that, when executed by the one or more processors, cause the one or more processors to replace one or more non-linear devices of the input power converter circuit model with one or more power sources. In some embodiments, the one or more non-transitory computer-readable storage media further includes instructions that, when executed by the one or more processors, cause the one or more processors to convert a transformer component in the reduced power converter circuit model into a set of parallel transformer impedance branches, wherein a transformer impedance branch (i) comprises a transformer impedance and (ii) is coupled in series with a noise source voltage. In some embodiments, the one or more non-transitory computer-readable storage media further includes instructions that, when executed by the one or more processors, cause the one or more processors to convert one or more transformer primary side circuit components in the reduced power converter circuit model into a load impedance branch that comprises a load impedance. In some embodiments, the one or more non-transitory computer-readable storage media further includes instructions that, when executed by the one or more processors, cause the one or more processors to couple a balance impedance branch that comprises a balance impedance to each transformer impedance branch in the impedance circuit model. In some embodiments, the one or more non-transitory computer-readable storage media further includes instructions that, when executed by the one or more processors, cause the one or more processors to (i) convert a plurality of transformer impedances of the impedance balanced circuit model into a plurality of respective RLC branches; and (ii) replace an entirety of balance impedances of the impedance balanced circuit model with an RLC balance branch that comprises a same serial resonant frequency as the plurality of transformer impedances.

BRIEF DESCRIPTION OF THE DRAWINGS

Embodiments incorporating teachings of the present disclosure are shown and described with respect to the figures presented herein.

DETAILED DESCRIPTION

Figure 1A:
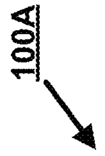
FIGS. 1A, 1B, 1C, and 1D illustrate example common mode (CM) electromagnetic interference (EMI) circuit modeling of a two-switch forward converter in accordance with some embodiments discussed herein.
Figure 1A:
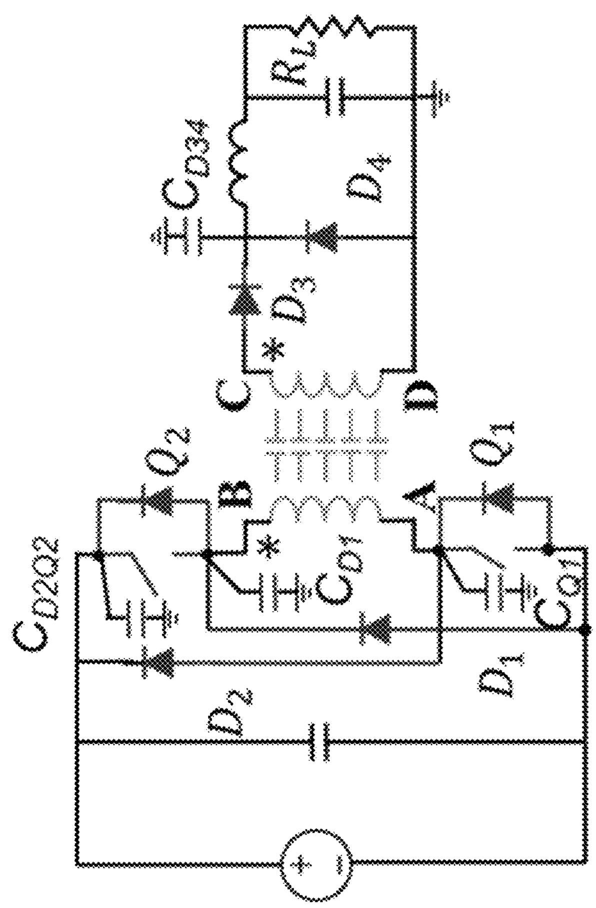

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

A non-volatile computer-readable storage medium may include a floppy disk, flexible disk, hard disk, solid-state storage (SSS) (e.g., a solid-state drive (SSD), solid-state card (SSC), solid-state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

A volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, processor(s), and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

General Overview and Example Technical Improvements

The present disclosure provides resistor, inductor, and capacitor (RLC) impedance balanced circuits for reducing common mode (CM) electromagnetic interference (EMI) noise caused by transformers in isolated converters for a wide range of frequencies. The disclosed RLC impedance balanced circuits comprise smaller footprints than that of convention EMI filters. For example, a convention EMI filter may comprise a differential mode noise reduction circuit and a common mode noise reduction circuit, where each of the circuits may further comprise corresponding capacitors and inductors. By contrast, according to various embodiments of the present disclosure, a branch comprising a resistor, inductor, and capacitor (RLC) may be coupled to a transformer circuit to achieve impedance balancing for a wide frequency range to attenuate CM noise through the transformer.

Example Capacitance Balancing Method

A. Capacitance Balanced Circuit Based on Two-Capacitor Model of Transformer

Substitution theory and superposition theory may be applied to analyze CM noise of a two-switch forward converter as depicted in FIG. 1A through FIG. 1D. Non-linear devices in the converter circuit model 100A depicted in FIG. 1A may be replaced by power (e.g., voltage or current) sources whose waveforms are the same as the replaced devices using substitution theory, as presented in FIG. 1B. Non-linear devices may comprise semiconductor devices (e.g., transistors and diodes), ferrite inductors (e.g., driver at high current where magnetic saturation occurs), amplifiers, and integrated circuits.

Figure 1B:
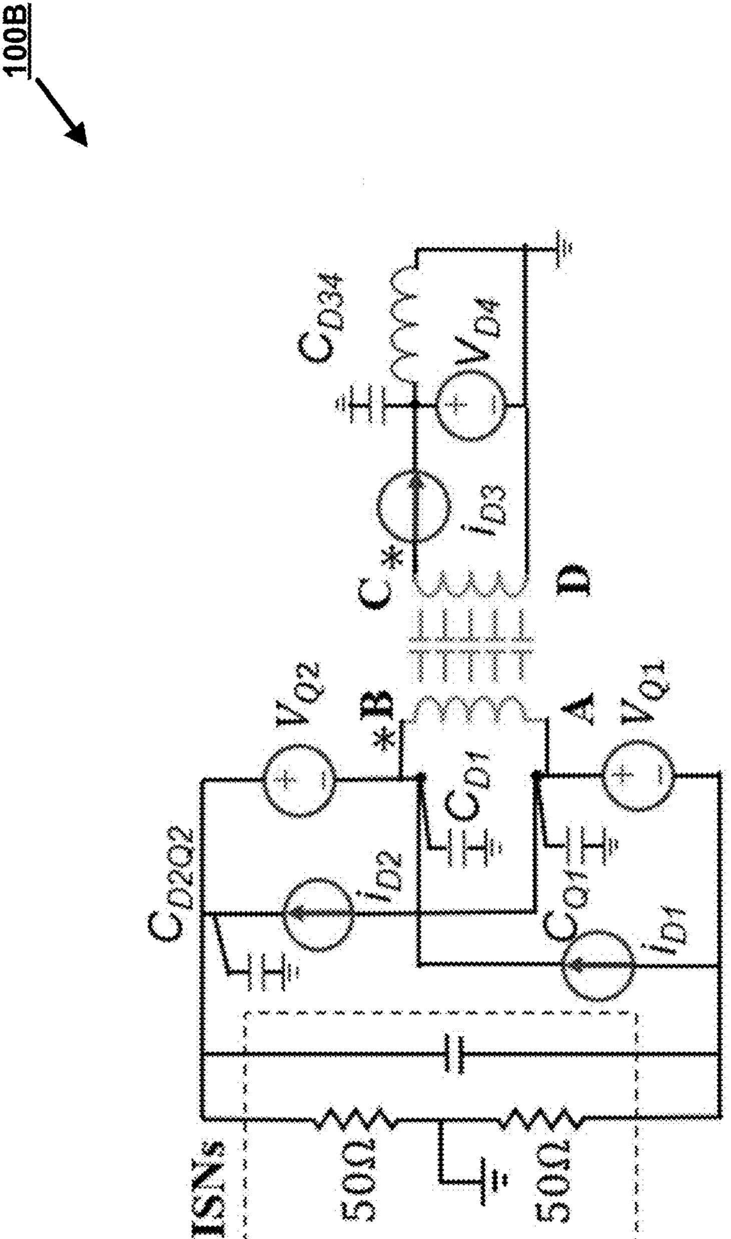
Figure 1C:
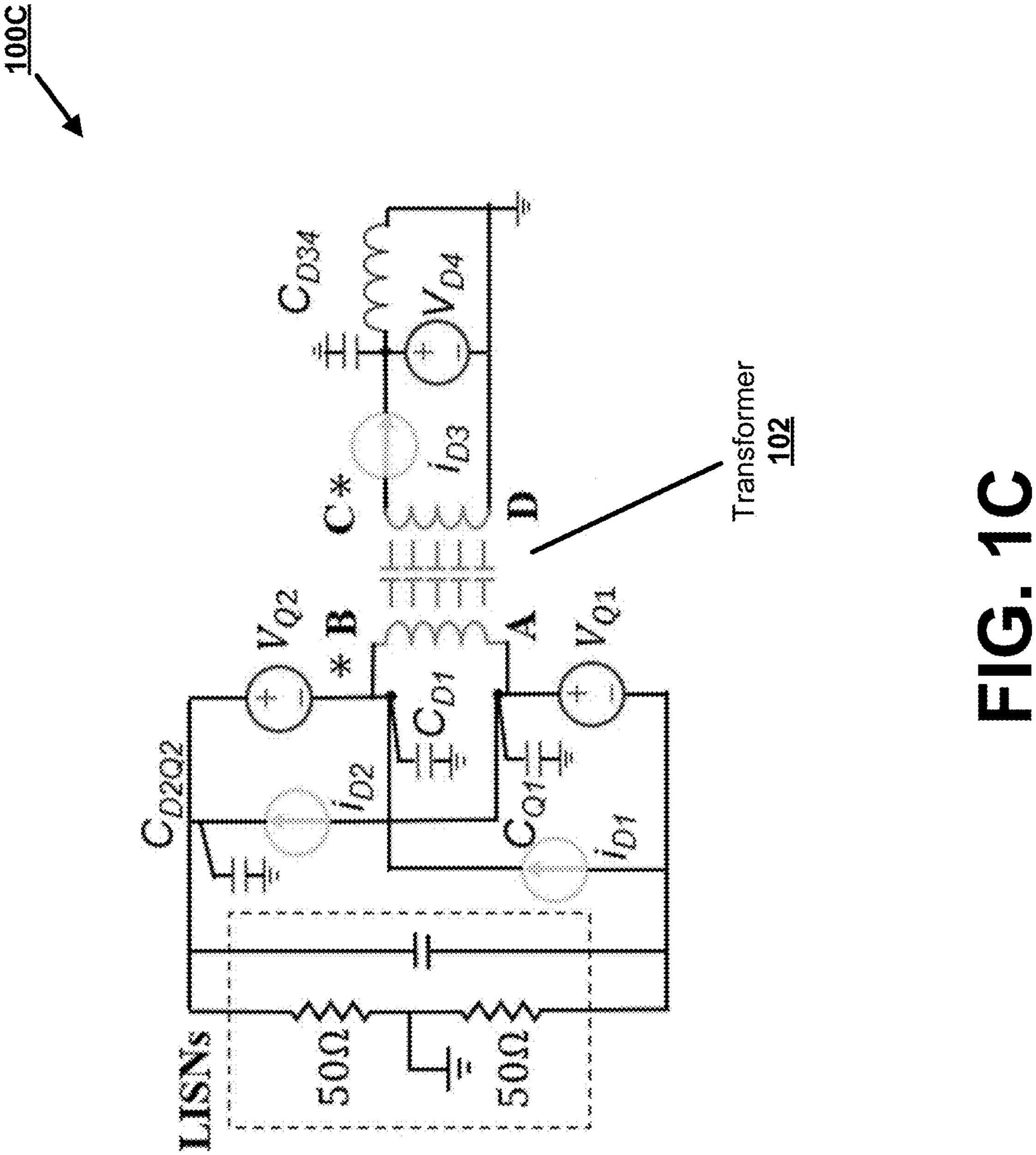
Figure 1D:
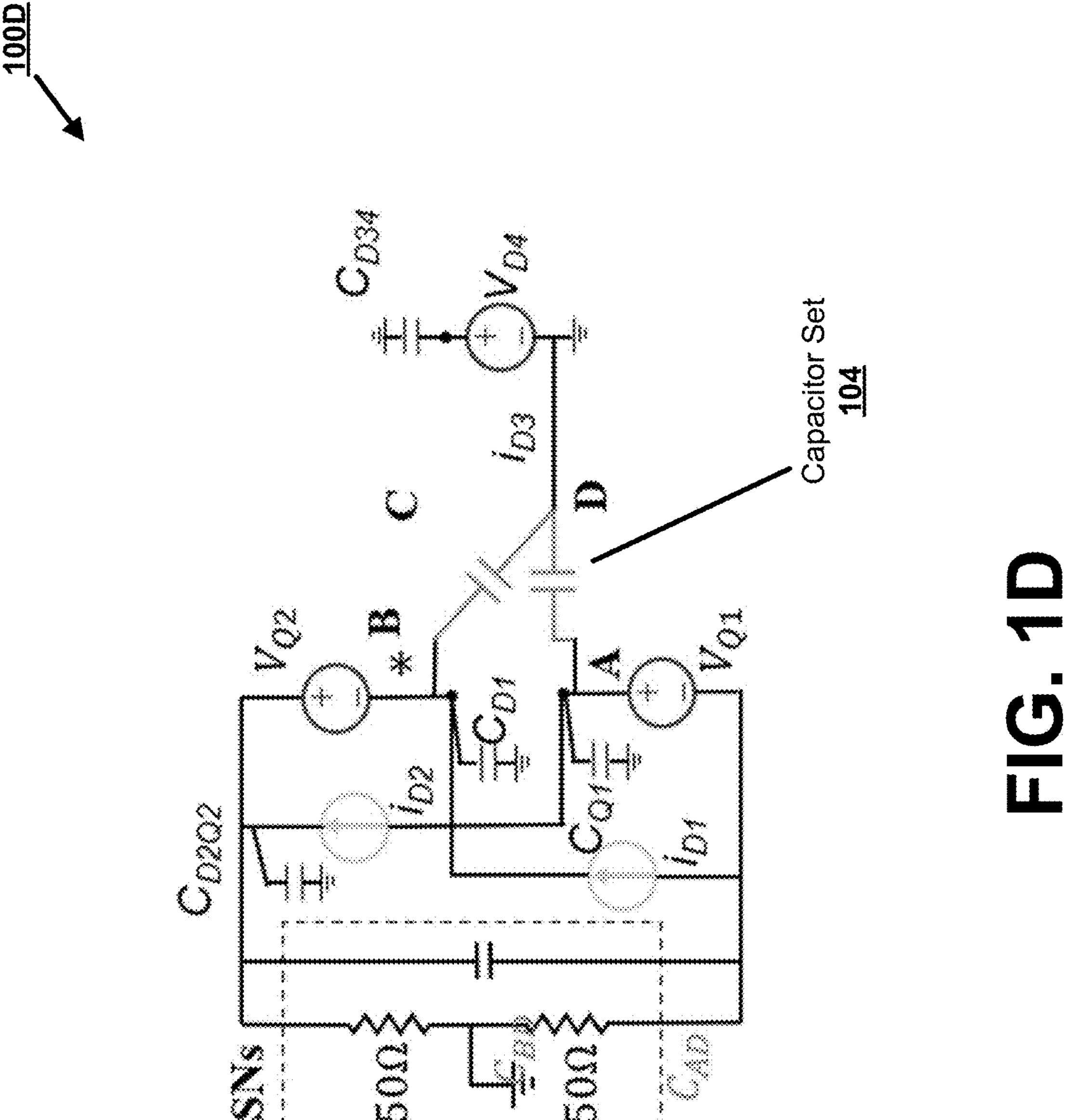

With the converter circuit 100B depicted in FIG. 1B, the contribution of each source to CM EMI noise may be analyzed with superposition theory. Sources that have no contribution to CM EMI noise may be removed to form a reduced CM EMI circuit model 100C, as depicted in FIG. 1C, where the removed sources are depicted as faded components. A capacitor set 104 that comprises a pair of parallel capacitors may be used to represent a transformer 102 of reduced CM EMI circuit model 100C. As depicted in FIG. 1D, a two-capacitor circuit model 100D may be used to represent the reduced CM EMI circuit model 100C for CM analysis by substituting the transformer 102 with the capacitor set 104. FIG. 1D further depicts the two-capacitor circuit model 100D, where noise source voltages $V_{Q1}$ and $V_{Q2}$ may be tuned to be the same.

Figure 2:
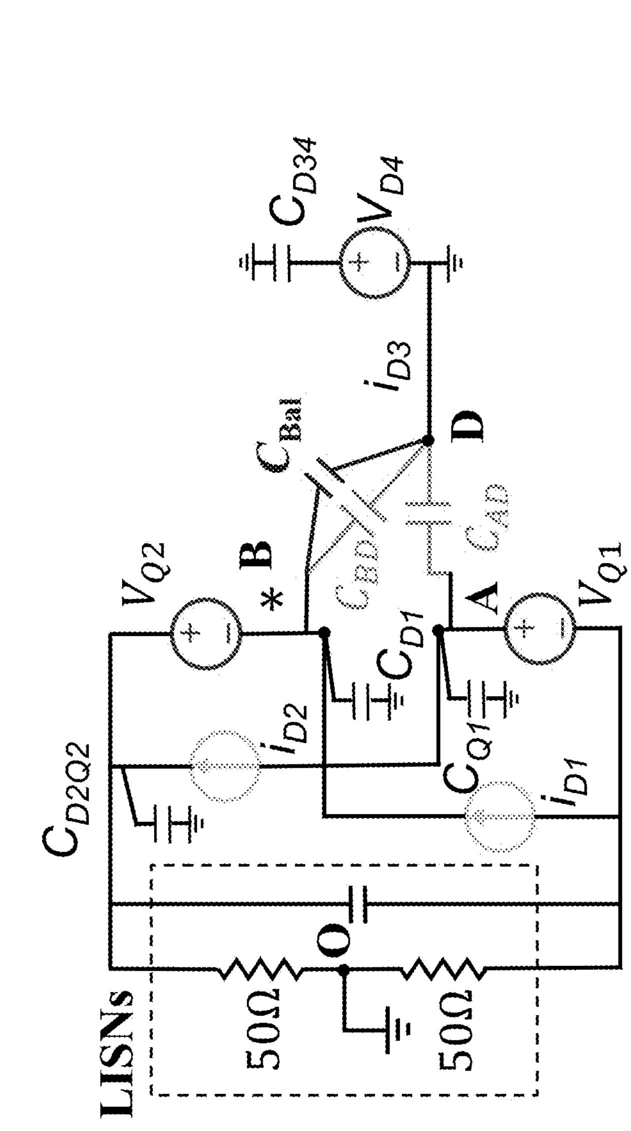
FIG. 2 illustrates an example capacitance balanced CM EMI circuit model.

Capacitance balancing may be employed in isolated power converters comprising transformers to reduce CM EMI noise. Referring to FIG. 2, a balance capacitor may be added in parallel with branch BD of the two-capacitor circuit model 100D such that the sum of capacitances of the two branches may be the same. For example, $C_{Bal}$ may be added parallel with $C_{BD}$ of branch BD to make $C_{AD}=C_{BD}+C_{Bal}$, assuming $C_{BD}$ is smaller than $C_{AD}$. The capacitance balanced CM EMI circuit model 200 comprises a voltage potential at point D that is equivalent to that of point O. Thus, the CM noise flowing through the line impedance stabilization network (LISN) may be largely reduced. However, the capacitance balanced CM EMI circuit model 200 may only be effective for achieving CM EMI noise balance for a limited and low-frequency range. The impact of a balance capacitor on CM EMI for higher frequencies may be undesirable.

B. Analysis of Capacitance Balanced Circuit

Figure 3:
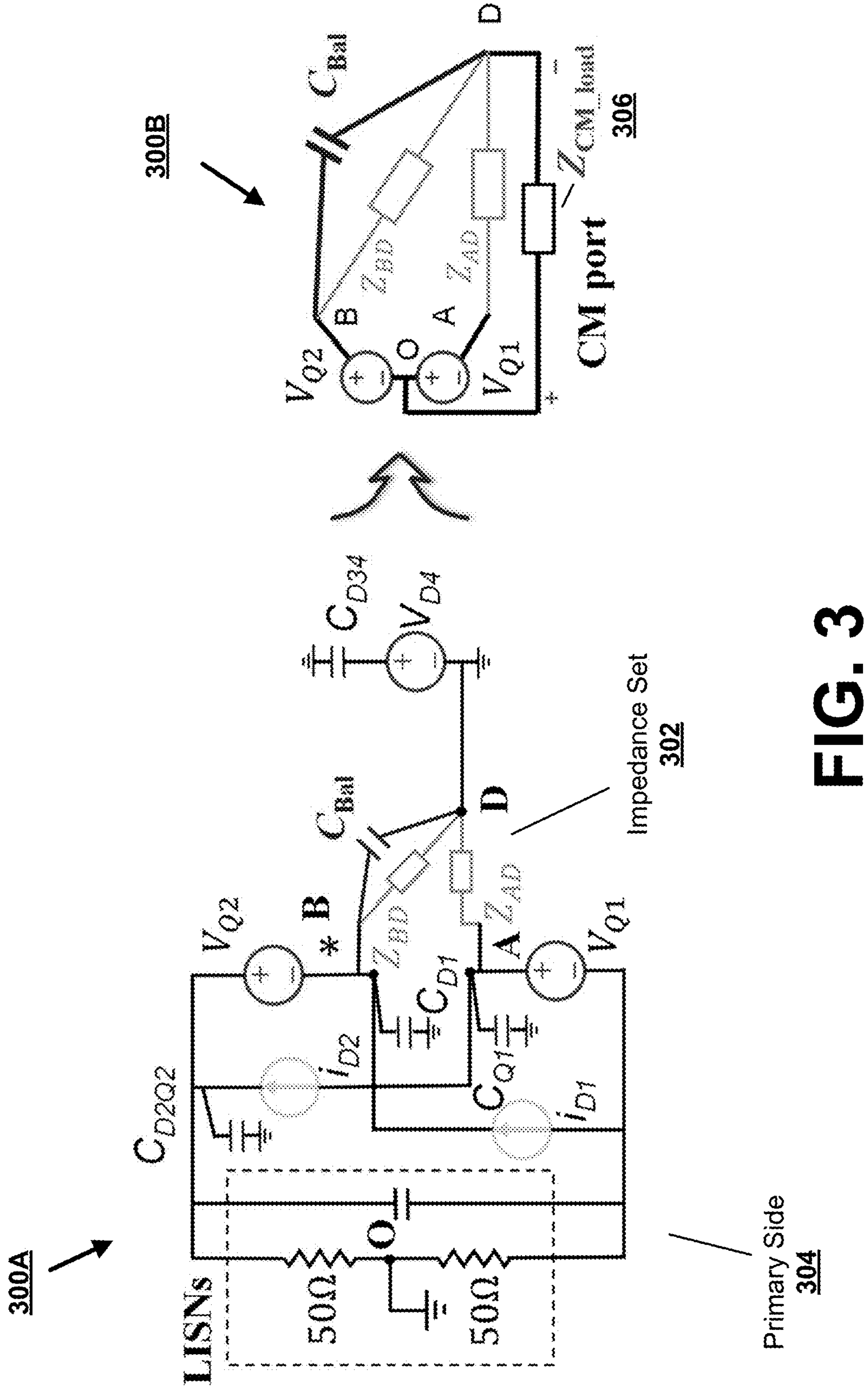
FIG. 3 illustrates an example two-impedance CM EMI circuit model and a reduction thereof.

FIG. 3 illustrates an example two-impedance CM EMI circuit model 300A and a reduction thereof to two-impedance CM EMI circuit model 300B. A two-impedance CM EMI circuit model 300A may comprise a conversion of the reduced CM EMI circuit model 100C by substituting the transformer 102 with an impedance set 302. The impedance set 302 comprises a pair of impedances ($Z_{BD}$ and $Z_{AD}$) that may be used to represent the transformer 102 for high-frequency CM EMI analysis. Additionally, assuming that CM noise propagating through the transformer is the main noise contribution, the two-impedance CM EMI circuit model 300A may be reduced to two-impedance CM EMI circuit model 300B by converting remaining portions (e.g., primary side 304) of the two-impedance CM EMI circuit model 300A to a CM load impedance ($Z_{CM\_load}$) 306. Thus, the two-impedance CM EMI circuit model 300B comprises (i) a first transformer impedance branch ($V_{Q1}$ in series with $Z_{AD}$), (ii) a second transformer impedance branch ($V_{Q2}$ in series with $Z_{BD}$ and $C_{BAL}$, where $C_{BAL}$ is in parallel with $Z_{BD}$) that is in parallel with the first transformer impedance branch, and (iii) a CM load impedance branch ($Z_{CM\_load}$ that is in parallel with both the first transformer impedance branch and the second transformer impedance branch and their respective noise source voltages).

A CM voltage gain ($Gain_{CM}$) may be defined as the ratio between the open-circuit voltage ($V_{open\text{-}circuit}$) at the CM port and the noise source voltage ($V_{Q1}$) may be calculated by:

$$Gain_{CM} = \frac{V_{open-circuit}}{V_{Q1}} = \frac{Z'_{BD} - Z_{AD}}{Z'_{BD} + Z_{AD}} \quad \text{Equation 1}$$

Then the CM current ($I_{CM}$) flowing through the CM load may be calculated by:

$$I_{CM} = \frac{V_{Q1} Gain_{CM}}{Z'_{BD} \parallel Z_{AD} + Z_{CM\_load}} \quad \text{Equation 2}$$

Figure 4:
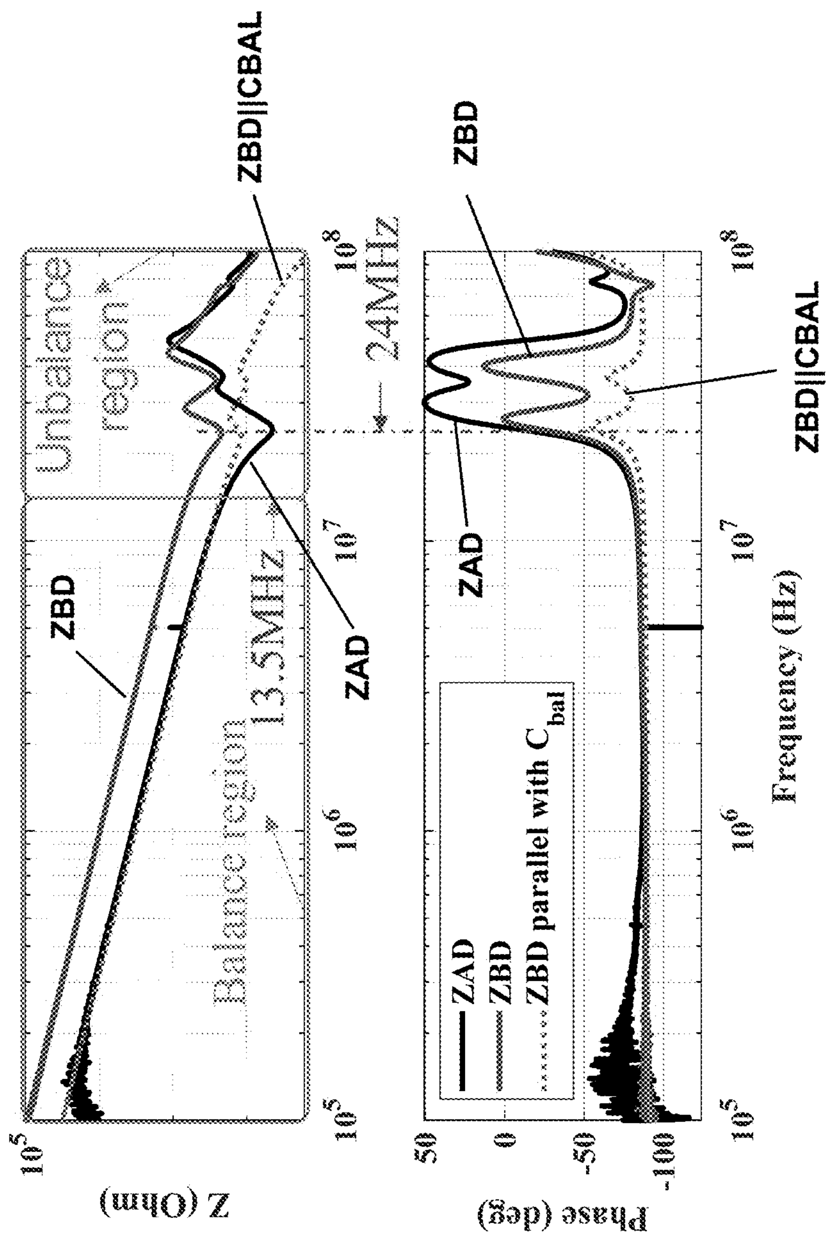
FIG. 4 illustrates example impedance measurements of a transformer.

Example impedance measurements of a transformer used for a two-switch forward converter are depicted in FIG. 4. The graphs in FIG. 4 depict impedances of impedance $Z_{AD}$, $Z_{BD}$, and $Z_{BD}$ in parallel with a balance capacitor $C_{bal}$. As observed with reference to FIG. 4, the effectiveness of balance may be suitable below approximately 13.5 MHz and begins to deteriorate with increasing frequency due to the resonance of impedance $Z_A$D and $Z_{BD}$. Hence, while acceptable for lower frequencies, capacitance balancing based on the two-capacitor circuit model would fail at higher frequencies.

C. Investigation of Potential CM EMI Noise Spike on Transformer Path

Four potential components of the capacitance balanced CM EMI circuit model 300 that may cause EMI noise spikes include: (1) switching waveform associated with $V_{Q1}$ and $V_{Q2}$, (2) common voltage gain associated with $Gain_{CM}$, (3) transformer equivalent impedance associated with $Z_{BD}'\|Z_{AD}$, and 4) CM load impedance ($Z_{CM\_load}$).

Figure 5A:
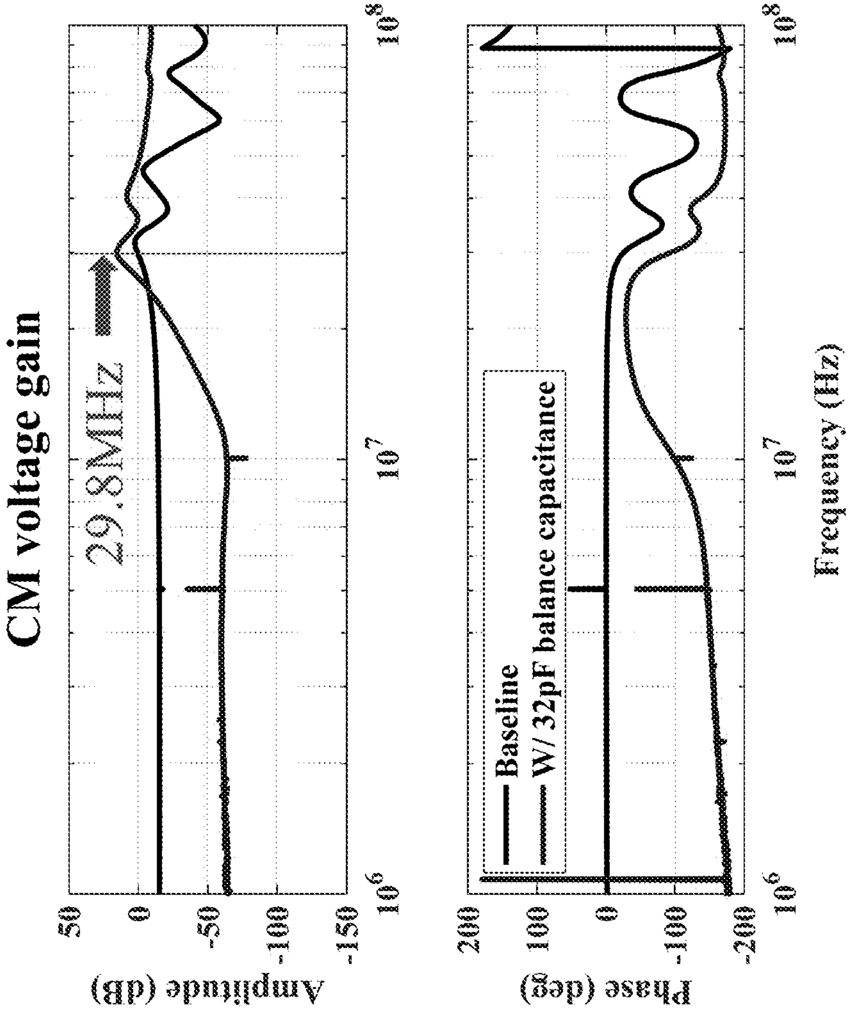
FIG. 5A illustrates an example plot of CM voltage gain versus frequency of a transformer.
Figure 5B:
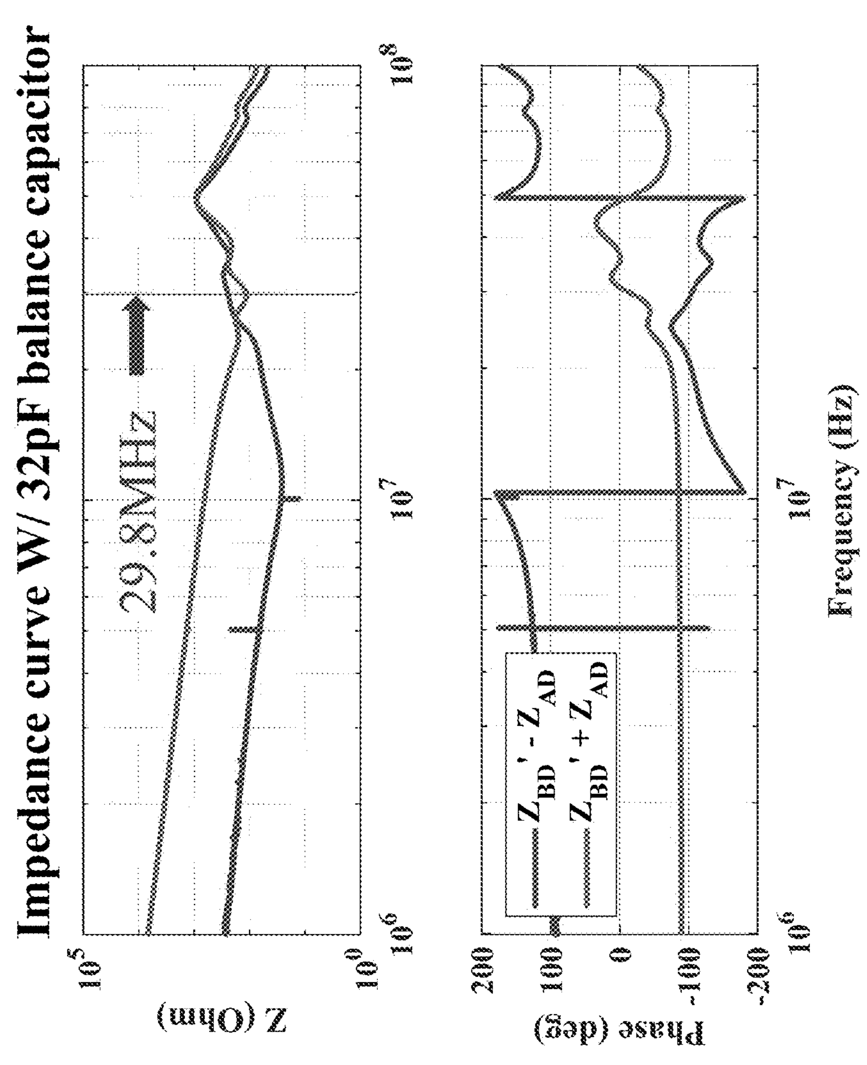
FIG. 5B illustrates an example impedance curve of a balance capacitor.

Analysis of spikes caused by the common voltage gain and the transformer equivalent impedance is discussed herewith. CM voltage gain $Gain_{CM}$ versus frequency may be calculated with the impedance curves of $Z_{BD}'$ and $Z_{AD}$, as depicted in FIG. 5A. When a balance capacitor is employed, the $Gain_{CM}$ at low frequency may be largely reduced. However, $Gain_{CM}$ will increase and show a peak at approximately 29.8 MHz, which is caused by the resonance of the sum of $Z_{BD}'$ and $Z_{AD}$, as illustrated in FIG. 5B. The CM voltage spike may cause a larger CM EMI noise spike.

Figure 6:
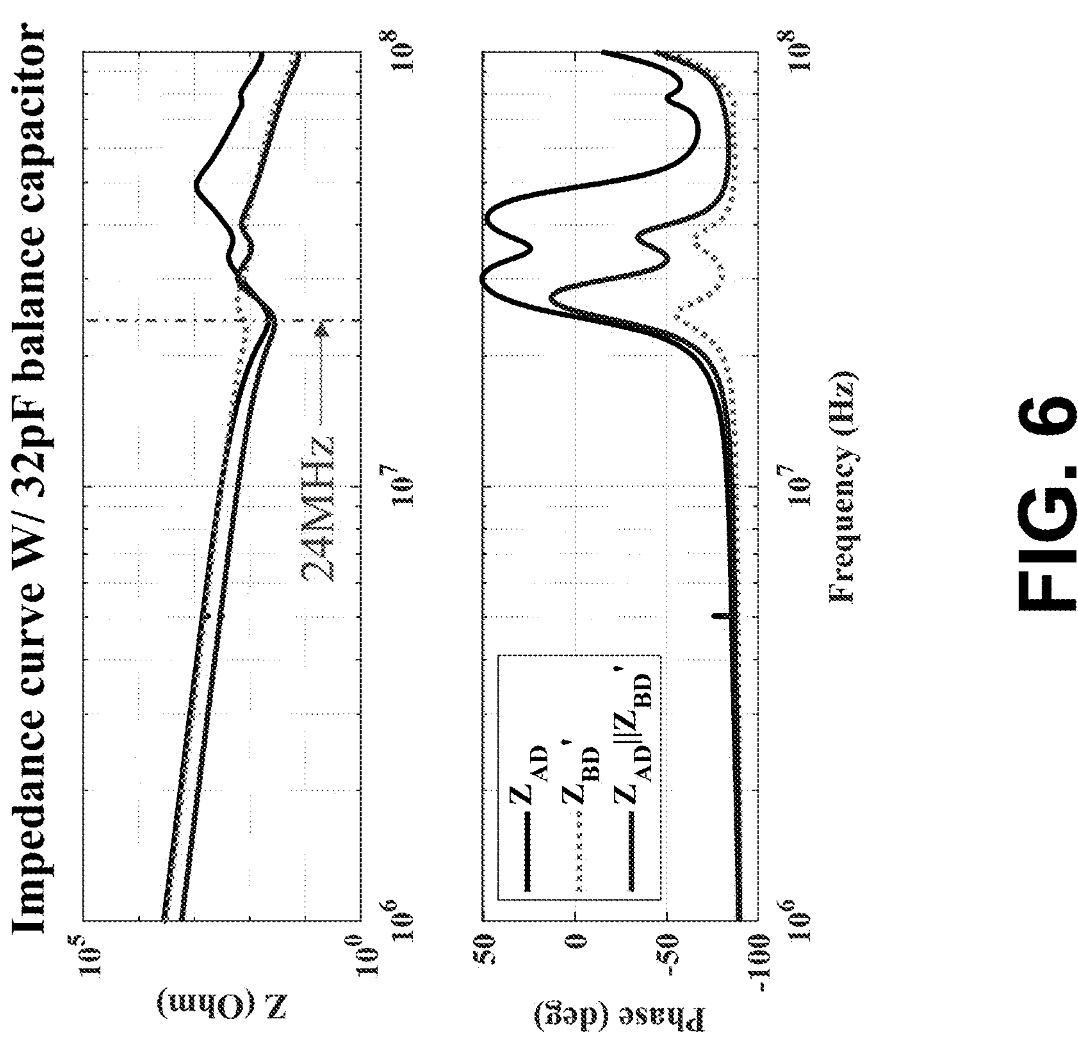
FIG. 6 illustrates an example transformer equivalent CM impedance curve.

Moreover, the serial resonance of transformer equivalent impedance $Z_{BD}\|Z_{AD\ may}$ also cause CM EMI spikes due to the occurrence of a valley of impedance on the CM noise propagation path. A transformer equivalent CM impedance curve is depicted in FIG. 6. The impedance valley at approximately 24 MHz results in large CM current flows through the CM load.

Characterization of CM Impedance of Transformer

A. RLC Branch Circuit Modeling for CM Impedance of Transformer

Figure 7:
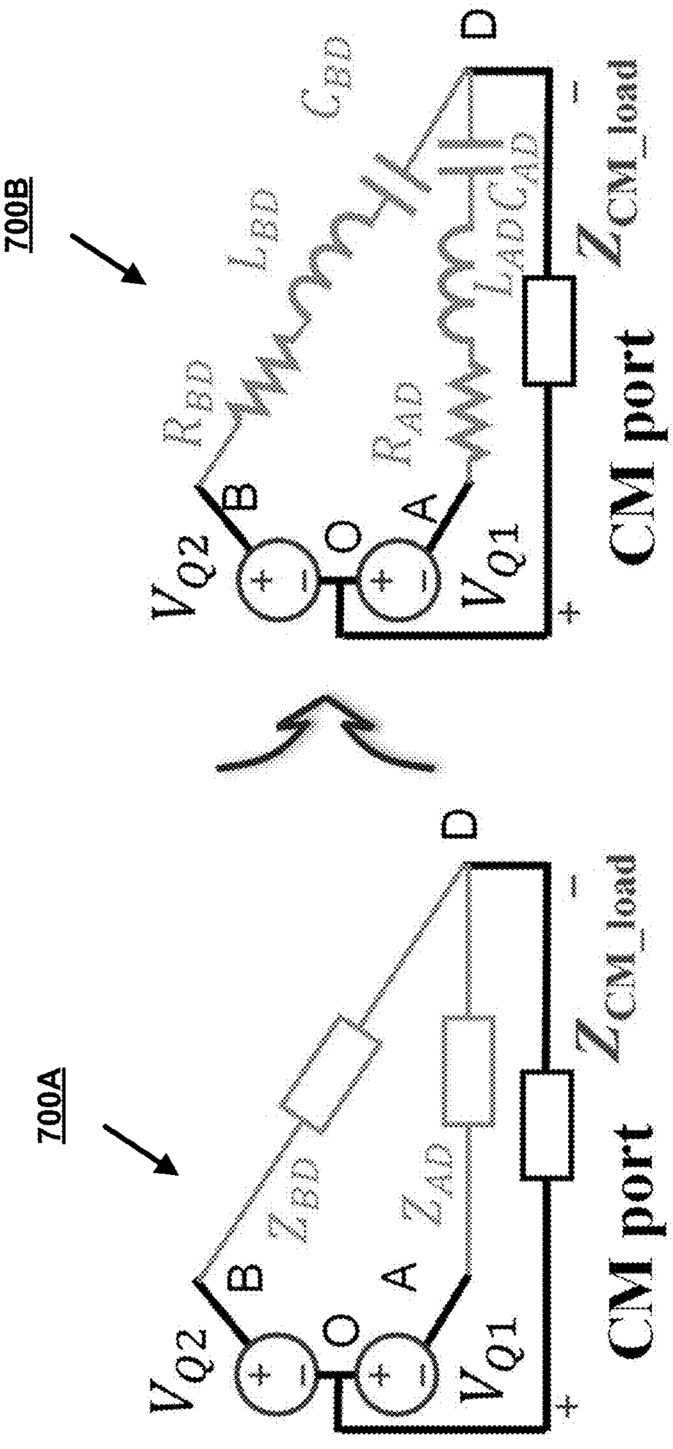
FIG. 7 is an example RLC transformation of a two-impedance CM circuit model in accordance with some embodiments discussed herein.

FIG. 7 is an example RLC transformation of a two-impedance CM circuit model according to some embodiments of the present disclosure. At low frequency, a two-capacitor circuit model may be used to represent the CM path of a transformer. However, with increasing frequency, the capacitors in the circuit model may be transformed to inductance caused by parasitic inductance of the CM path of the transformer. As such, RLC branches (such as in CM EMI RLC circuit model 700B) may be used to represent the two CM impedances, $Z_{BD}$ and $Z_{AD}$, of a two-impedance CM circuit model, such as CM EMI impedance circuit model 700A depicted in FIG. 7. $Z_{AD}$ represented in Equation 3 and $Z_{BD}$ represented in Equation 4 may be used to represent the impedance of branch AD and branch BD, respectively.

$$Z_{AD} = \frac{1}{sC_{AD}} + R_{AD} + sL_{AD} \quad \text{Equation 3}$$

$$Z_{BD} = \frac{1}{sC_{BD}} + R_{BD} + sL_{BD} \quad \text{Equation 4}$$

In CM EMI RLC circuit model 700B, $C_{AD}$ and $C_{BD}$ may represent the capacitance of branch AD and BD. $L_{AD}$ and $L_{BD}$ may represent the inductance of branch AD and BD which may be resonant with $C_{AD}$ and $C_{BD}$. $R_{AD}$ and $R_{BD}$ may represent the resistance of branch AD and BD at resonance. These RLC parameters may be extracted based on the CM impedance curve of the CM EMI RLC circuit model 700B.

B. Analysis of First Valley Resonance of CM Impedance

The CM impedances of a transformer may be obtained by the S-parameter of a two-port network, which may be measured through a vector network analyzer. The formula of transformation between the S-parameter and Z-parameter is provided by the following:

$$Z_{BD} = \frac{Z_{01}((1+S_{11})\cdot(1+S_{22}) - S_{12}\cdot S_{21})}{2S_{21}} \quad \text{Equation 5}$$

$$Z_{AD} = \frac{Z_{01}((1+S_{11})\cdot(1+S_{22}) - S_{12}\cdot S_{21})}{(1+S_{11})\cdot(1-S_{22}) + S_{12}\cdot S_{21} - 2S_{21}} \quad \text{Equation 6}$$

$$Z_{numerator} = Z_{01}((1+S_{11})\cdot(1+S_{22}) - S_{12}\cdot S_{21}) \quad \text{Equation 7}$$

Figure 8:
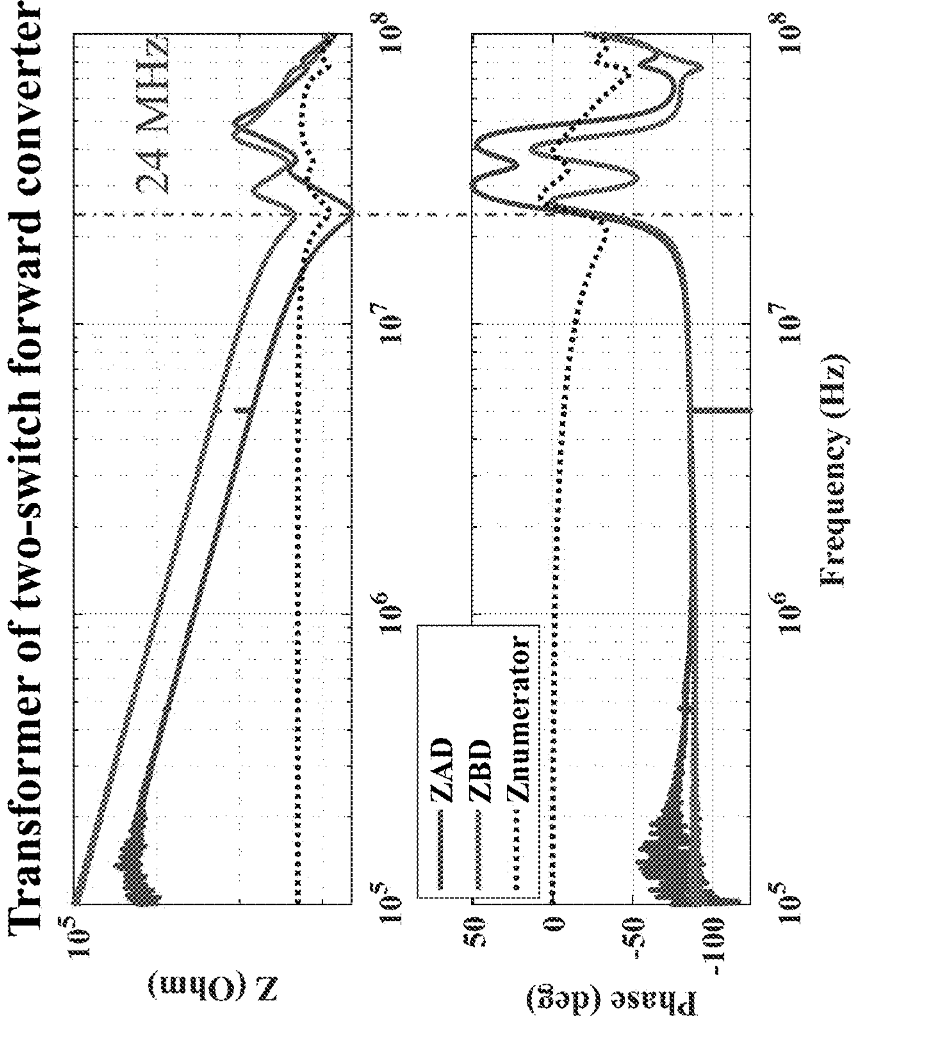
FIG. 8 illustrates an example comparison of CM impedances and S-Z transformation numerator of transformer for a two-switch forward converter.
Figure 9:
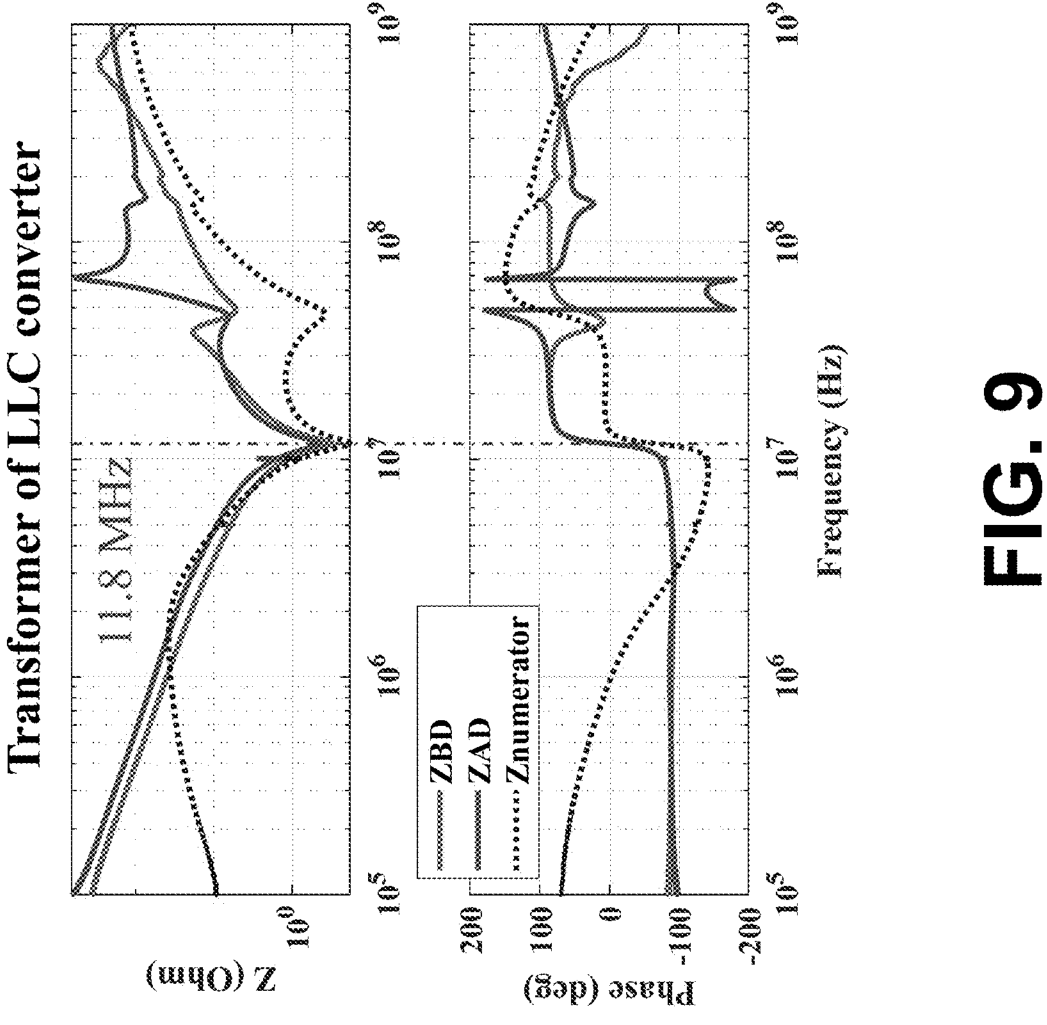
FIG. 9 illustrates an example comparison of CM impedances and S-Z transformation numerator of transformer for a two inductors and a capacitor (LLC) converter.

Noting that the numerators of Equation 5 and Equation 6 are the same (Equation 7), the frequency of resonance associated with the numerators may also be the same. The valley of the numerator may cause the valley of the two impedances. The measured impedance curves and numerator for two different transformers are shown in FIG. 8 and FIG. 9. The valley frequencies of the numerators may be the same as that of CM impedances. As such, the serial resonant frequency of branch AD ($f_{AD}$) and branch BD ($f_{BD}$) may be the same as provided below:

$$f_{AD} = f_{BD} = \frac{1}{2\pi\sqrt{L_{AD}C_{AD}}} = \frac{1}{2\pi\sqrt{L_{BD}C_{BD}}} \quad \text{Equation 8}$$

Example RLC Impedance Balancing Method

A. Impedance Balancing

Figure 10:
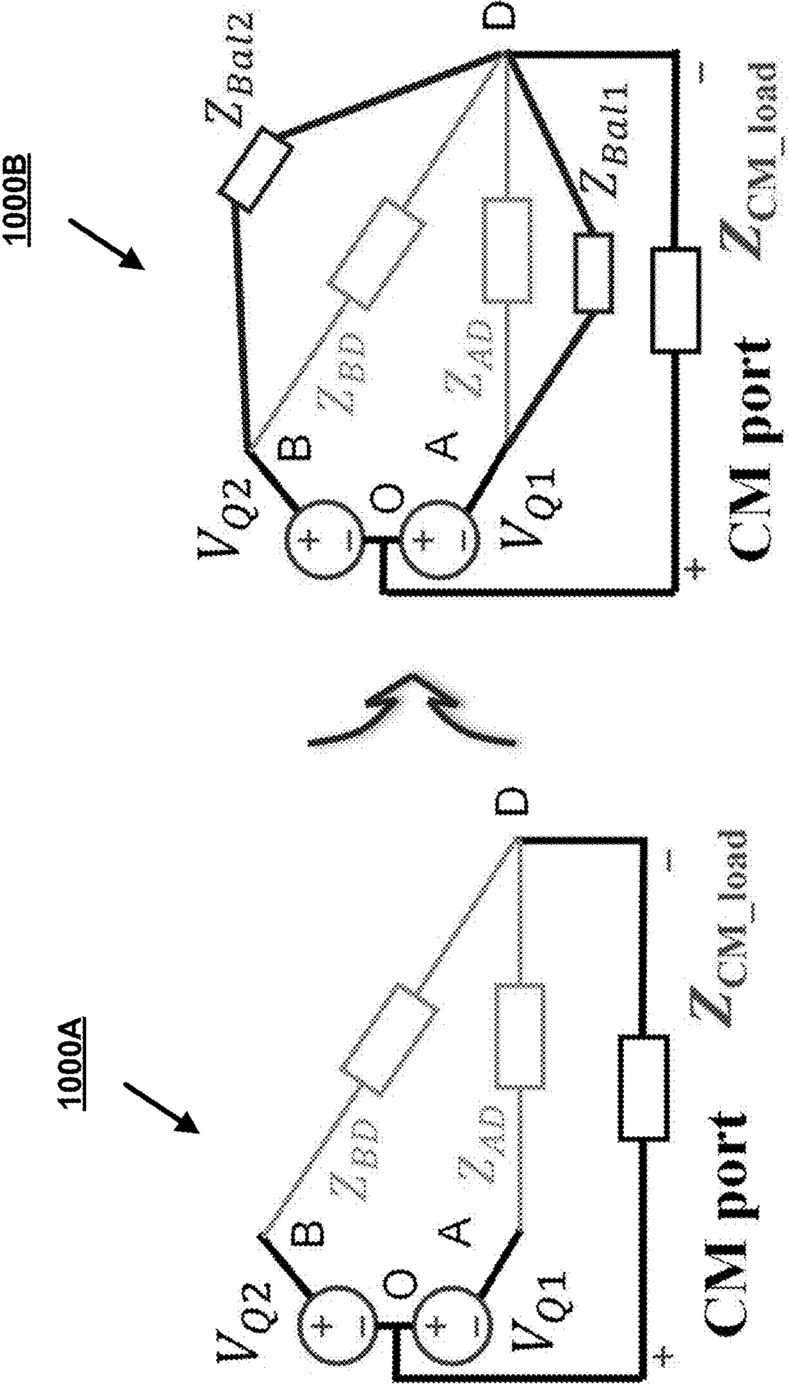
FIG. 10 illustrates example impedance balancing of a two-impedance CM EMI circuit model in accordance with some embodiments discussed herein.

To minimize CM noise from propagating through a CM load at a wider frequency range, capacitance balancing, as disclosed herewith, may be extended to impedance balancing. Referring to FIG. 10, balancing a transformer circuit for an entirety of a desired frequency range may require that the two CM impedances, $Z_{BD}$ and $Z_{AD}$, of CM EMI impedance circuit model 1000A be the same throughout a desired frequency range. Two balance impedances, $Z_{Bal1}$ and $Z_{Bal2}$, may be inserted parallel with $Z_{BD}$ and $Z_{AD}$, respectively, to make the impedances of branch AD and branch BD identical, creating impedance balanced CM EMI circuit model 1000B.

Equation 9 comprises a condition (e.g., impedance of branch AD and branch BD are identical) where as long as it is satisfied within a desired frequency range, CM noise may be largely reduced at the concerned frequency range.

$$Z_{AD} \| Z_{Bal1} = Z_{BD} \| Z_{Bal2} \quad \text{Equation 9}$$

B. RLC Branch Design

Figure 11:
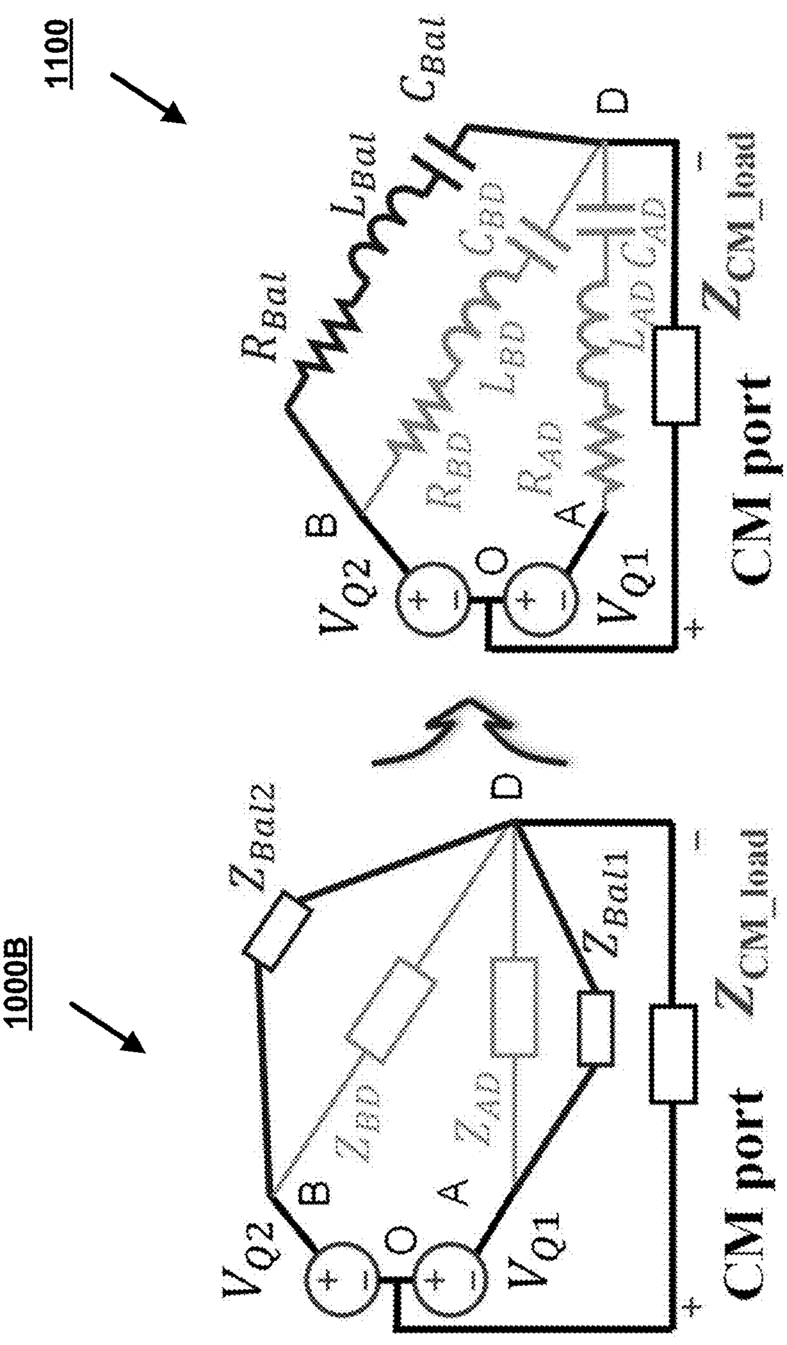
FIG. 11 illustrates example RLC impedance balancing based on an impedance balanced CM EMI circuit model in accordance with some embodiments discussed herein.

Via RLC branch circuit modeling discussed above, the impedances of CM EMI circuit model 1000B may be represented with RLC branches to create RLC CM EMI circuit model 1100, as depicted in FIG. 11. That is, branch $Z_{AD}$ may be converted to an RLC branch comprising $R_{AD}$, $L_{AD}$, and $C_{AD}$ that are connected in series and branch $Z_{BD}$ may be converted to an RLC branch comprising $R_{BD}$, $L_{BD}$, and $C_{BD}$ that are connected in series. An RLC balance branch comprising $R_{Bal}$, $L_{Bal}$, and $C_{Bal}$, may be added to the RLC CM EMI circuit model 1100 to achieve impedance balance (e.g., replacing $Z_{Bal1}$ and $Z_{Bal2}$) at a wider frequency range. Due to branch AD and branch BD being able to be transferred from capacitance to inductance at the same frequency, an RLC balance branch with the same serial resonant frequency as branches AD and BD may be added in place of the balance impedances to RLC CM EMI circuit model 1100 to achieve impedance balance at the capacitive region, resonance point, and inductive region, thereby creating an RLC impedance balanced CM EMI circuit model 1100, as depicted in FIG. 11.

The balance capacitor $C_{Bal}$ may be responsible for impedance balance between branch BD and AD at the low frequency, capacitive region of CM impedance. Assuming $C_{AD} > C_{BD}$, an RLC balance branch may be added, being parallel with branch BD, a balance capacitance may be calculated by:

$$C_{Bal} = C_{AD} - C_{BD} \quad \text{Equation 10}$$

To make an impedance balance between branch BD and AD at the inductive region, the resonant frequency of added RLC balance branch may be designed as the same as the valley resonance frequency of $Z_{AD}$ and $Z_{BD}$. Then the balance inductance may be calculated by:

$$L_{Bal} = \frac{L_{BD}\cdot C_{BD}}{C_{Bal}} = \frac{L_{BD}\cdot C_{BD}}{C_{AD} - C_{BD}} = \frac{L_{AD}\cdot C_{AD}}{C_{AD} - C_{BD}} \quad \text{Equation 11}$$

At the resonant frequency, the resistance of $Z_{AD}$ and $Z_{BD}$ should be balanced. Then the resistance may be calculated by:

$$R_{Bal} = \frac{R_{BD}R_{AD}}{R_{BD} - R_{AD}} \quad \text{Equation 12}$$

C. Theoretical Verification

The impedance of branch BD with the added balance impedance branch, $Z_{BD}'$, may be expressed by:

$$Z'_{BD} = Z_{BD} \| Z_{Bal} = \frac{\left(1 + C_{BD}R_{BD}s + C_{BD}L_{BD}s^2\right)\left(1 + (C_{AD} - C_{BD})R_{BD}\frac{R_{AD}}{(R_{BD} - R_{AD})}s + C_{AD}L_{AD}s^2\right)}{sC_{AD}\left(1 + \frac{(C_{BD}C_{AD} - C_{BD}^2)}{C_{AD}}\frac{R_{BD}^2}{(R_{BD} - R_{AD})}s + C_{BD}L_{BD}s^2\right)} \quad \text{Equation 13}$$

At low frequency (capacitive region), the first order and second-order terms in Equation 13 may be relatively smaller than 1. Then $$Z'_{BD}$$

may be reduced to a capacitor as shown in the following:

$$Z'_{BD} \approx \frac{1}{sC_{AD}} \quad \text{Equation 14}$$

At first resonating frequency, the second-order terms in Equation 13 tend towards −1. Thus, $$Z'_{BD}$$

may be reduced as:

$$Z'_{BD} = \frac{C_{BD}R_{BD}\left(\frac{(C_{AD} - C_{BD})R_{BD}R_{L2}}{R_{BD} - R_{AD}}\right)s}{(C_{BD}C_{AD} - C_{BD}^2)R_{BD}^2 / (R_{BD} - R_{AD})s} \approx R_{AD} \quad \text{Equation 15}$$

Above first resonating frequency (inductive region), the second-order term is much larger than first order term and 1. Thus, $$Z'_{BD}$$

may be reduced as $$Z'_{BD} = \frac{C_{BD}L_{BD}s^2C_{AD}L_{AD}s^2}{sC_{AD}C_{BD}L_{BD}s^2} \approx sL_{AD} \quad \text{Equation 16}$$

Using Equations 13 through 16, the CM impedance of the transformer at the capacitance region, inductance region, and resonating frequency may be balanced to reduce CM noise. Using Equations 10 through 12, the parameters of an RLC balance branch for a transformer used for a two-switch forward converter may be calculated.

Figure 12:
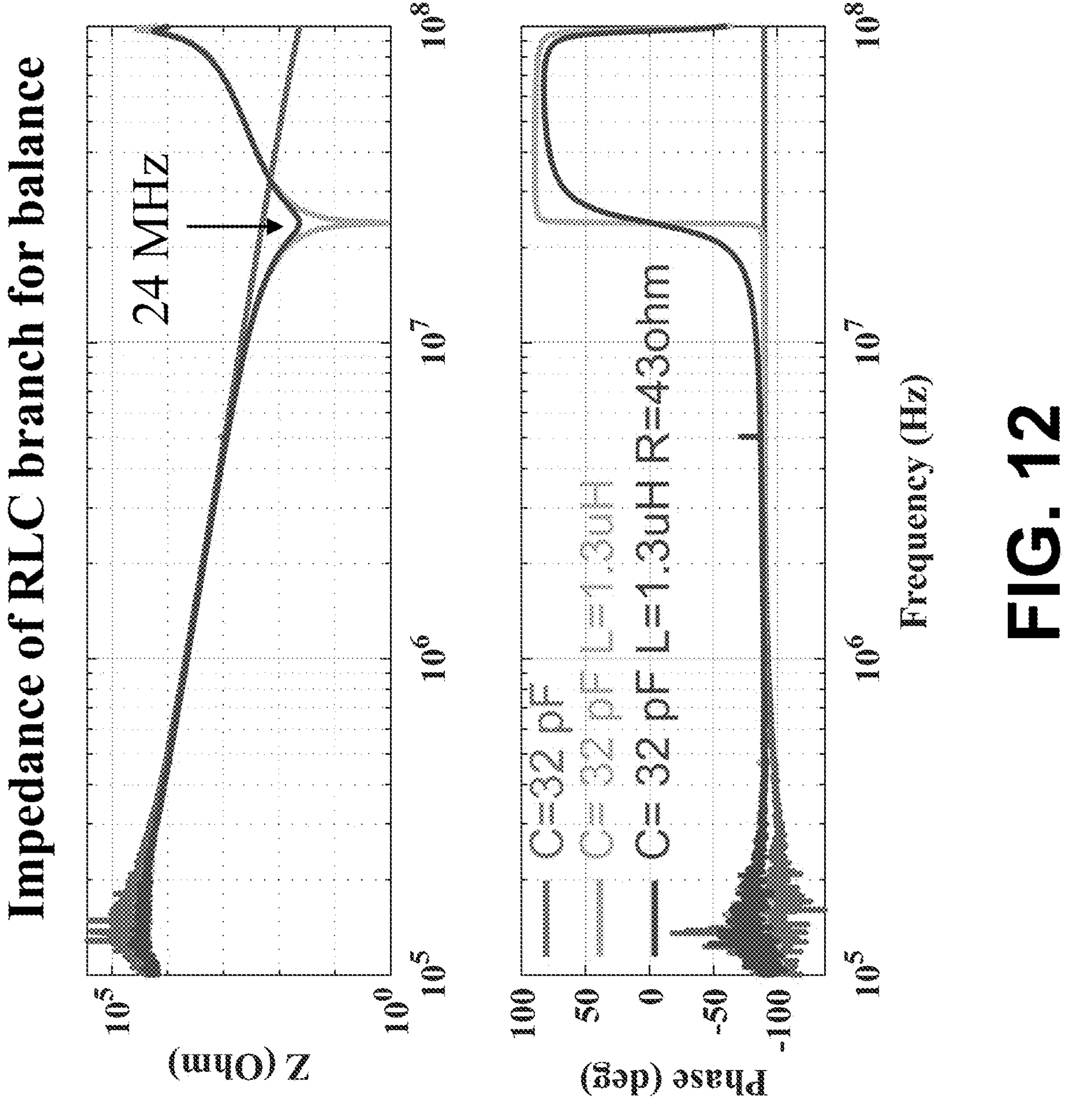
FIG. 12 illustrates example impedances of C, LC, and RLC balance branches for a transformer of two-switch forward converter in accordance with some embodiments discussed herein.
Figure 13:
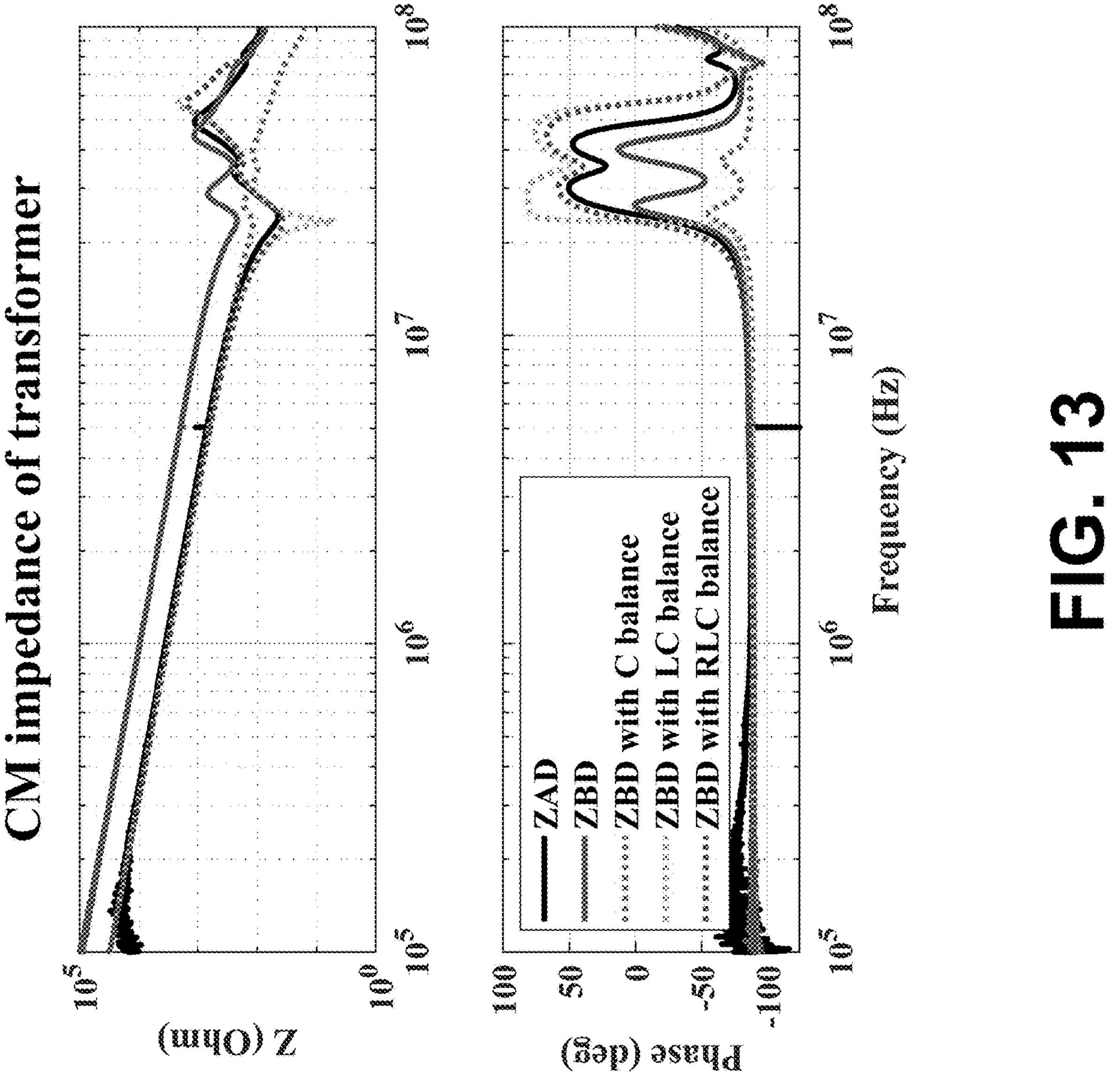
FIG. 13 illustrates example CM impedances of a transformer with C, LC, and RLC balance branches in accordance with some embodiments discussed herein.

Example impedance curves of C, LC, and RLC balance branches are depicted in FIG. 12. Example CM impedances of a transformer with branch BD parallel with C, LC, and RLC balance branches are depicted in FIG. 13. For the C balance branch, $Z_{BD}$ may be configured to be equivalent to $Z_{AD}$ at low-frequency ranges in the capacitive region while inequivalent to $Z_{AD}$ at higher frequencies. For the LC balance branch, $Z_{AD}$ may be configured to be equivalent to $Z_{BD}$ at the capacitive and inductive regions except for the resonant point. For the RLC balance branch, $Z_{AD}$ may be configured to be equivalent to $Z_{BD}$ at capacitive and inductive regions. According to the above conditions, balancing of the transformer at capacitive and inductive regions may be achieved.

Application to Other Isolated Power Converters

Figure 14:
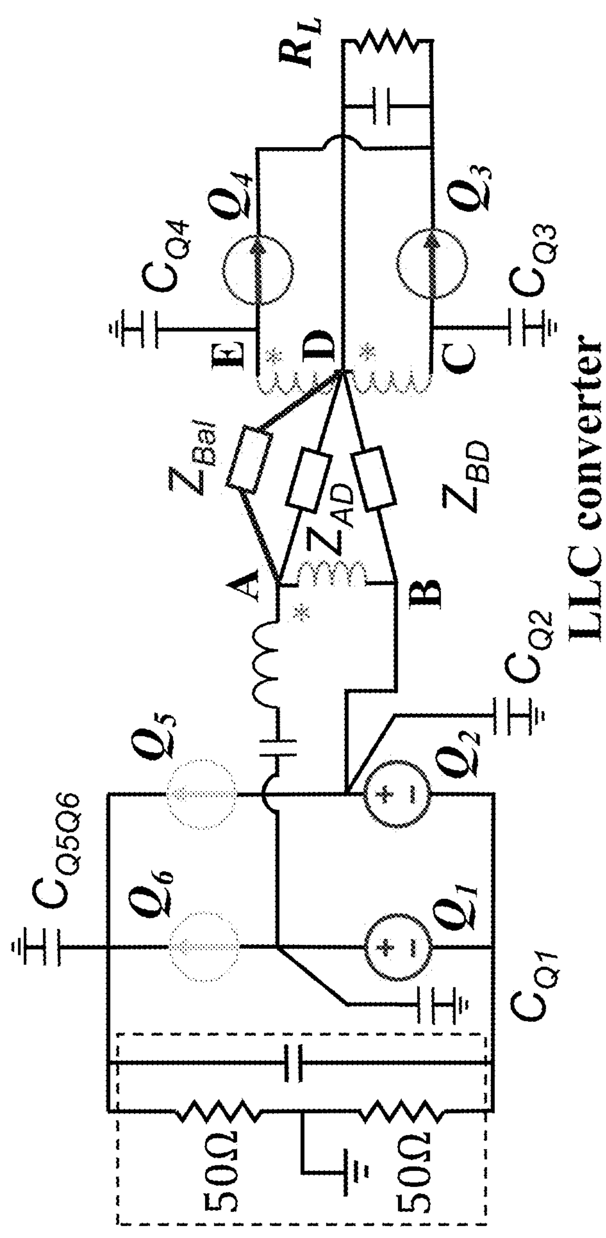
FIG. 14 illustrates an example impedance balanced LLC converter circuit model in accordance with some embodiments discussed herein.
Figure 15:
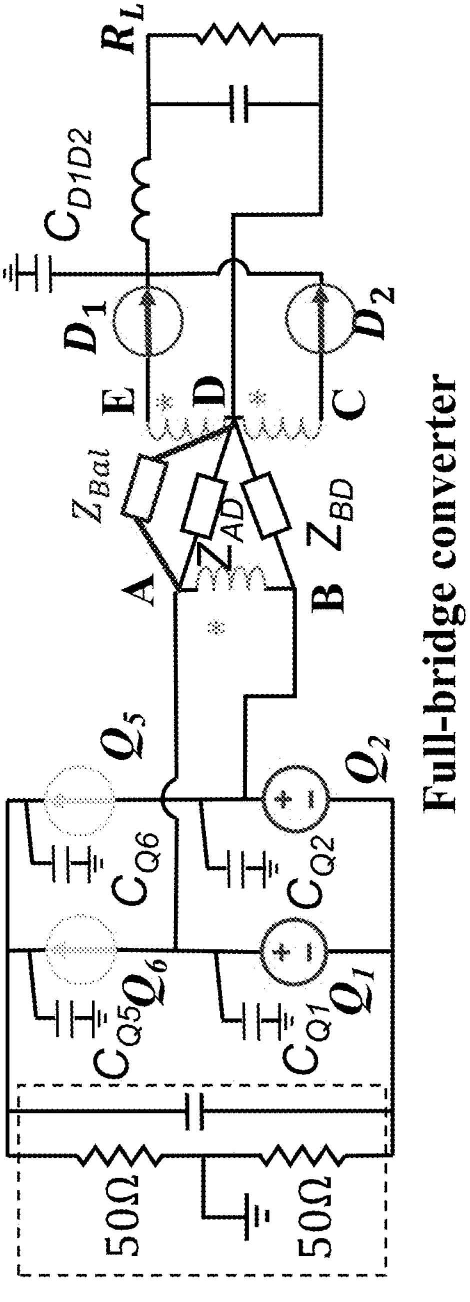
FIG. 15 illustrates an example impedance balanced full-bridge converter circuit model in accordance with some embodiments discussed herein.
Figure 16:
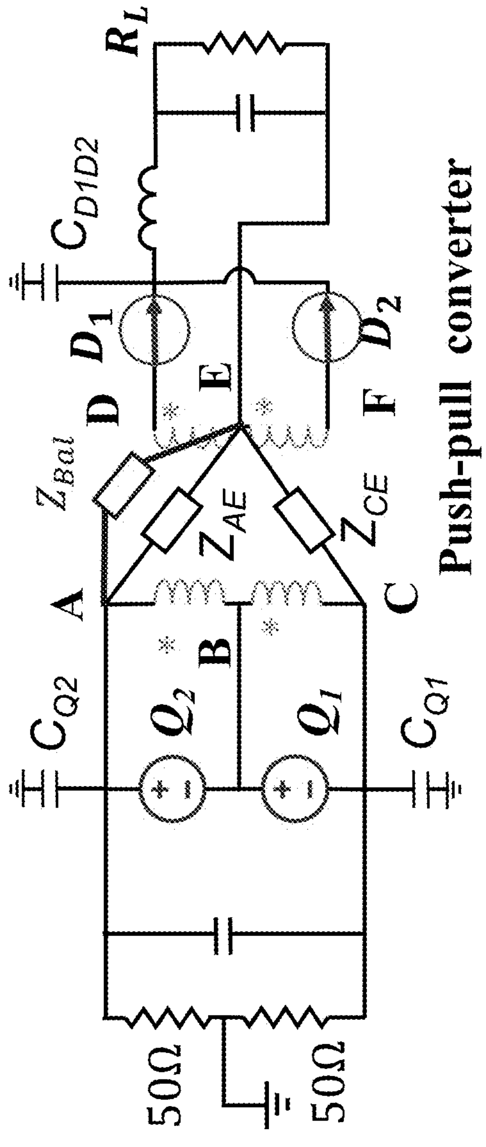
FIG. 16 illustrates an example impedance balanced push-pull converter circuit model in accordance with some embodiments discussed herein.

The disclosed RLC impedance balanced circuit may be applied to other isolated DC-DC converters using a transformer, such as a forward converter, a two inductors and a capacitor (LLC) converter (e.g., as depicted in FIG. 14), a full-bridge converter (e.g., as depicted in FIG. 15), or a push-pull converter (e.g., as depicted in FIG. 16) by applying impedance balancing, RLC branch circuit modeling, and the addition of an RLC balance branch.

Example RLC Impedance Balanced Circuit Conversion Method

Figure 17:
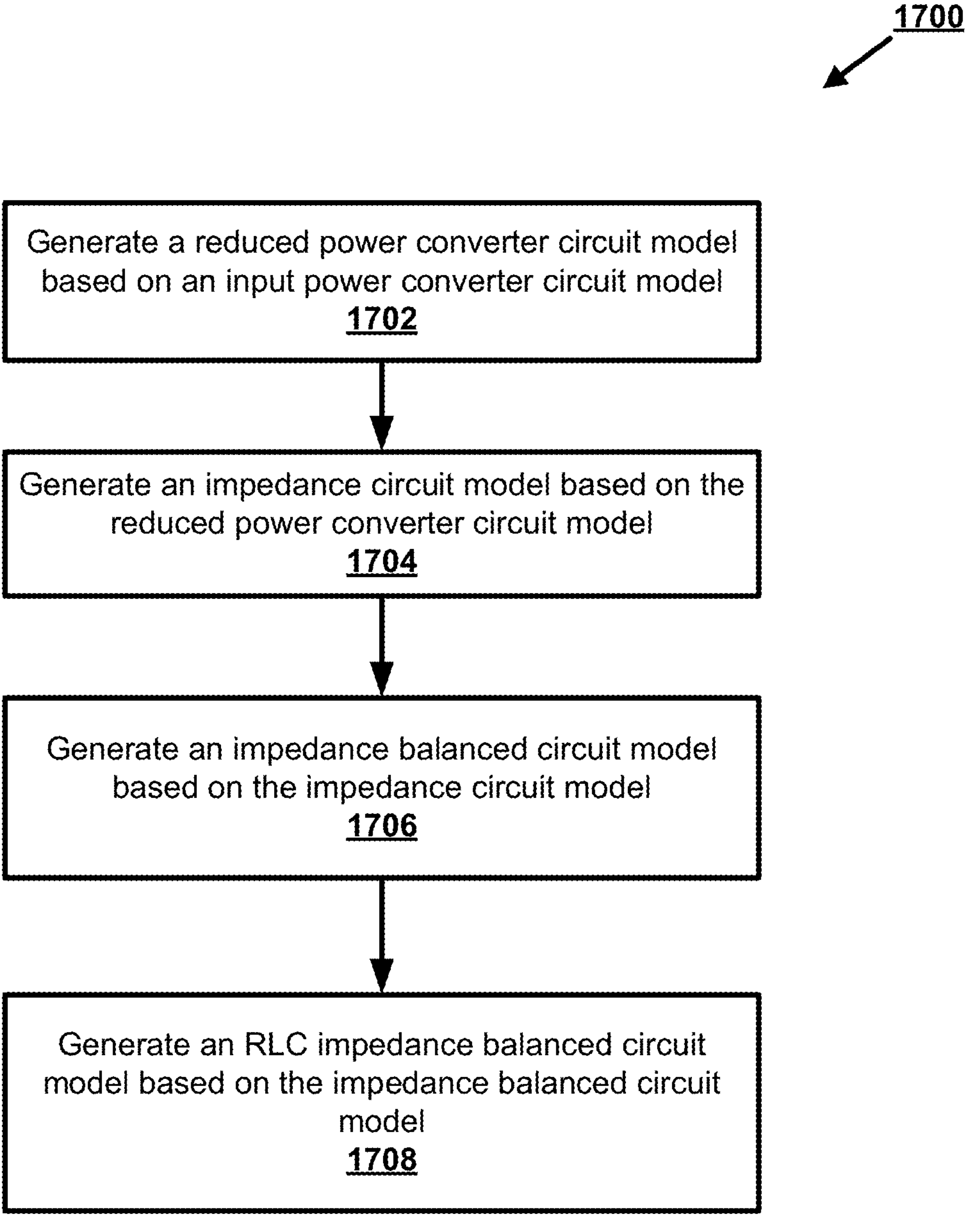
FIG. 17 is a flowchart diagram of an example process for reducing CM EMI noise of power converters in accordance with some embodiments of the present disclosure.

FIG. 17 is a flowchart diagram of an example process 1700 for reducing CM EMI noise of power converters in accordance with some embodiments of the present disclosure. It is noted that each block of a flowchart, and combinations of blocks in the flowchart, may be implemented by various means such as hardware, firmware, circuitry, and/or other devices associated with execution of software including one or more computer program instructions. For example, one or more of the steps/operations described in FIG. 17 may be embodied by computer program instructions, which may be stored by a non-transitory memory of an apparatus employing an embodiment of the present disclosure and executed by a processor component in an apparatus. For example, these computer program instructions may direct the processor component to function in a particular manner, such that the instructions stored in the computer-readable storage memory produce an article of manufacture, the execution of which implements the function specified in the flowchart block(s).

In some embodiments, the process 1700 begins at step/operation 1702 when the apparatus generates a reduced power converter circuit model based on an input power converter circuit model. According to various embodiments of the present disclosure, a reduced power converter circuit model is generated by applying substitution and/or superposition to the input power converter circuit model. For example, generating the reduced power converter circuit model, via substitution, may comprise replacing one or more non-linear devices of the input power converter circuit model with one or more power sources (e.g., voltage or current). Power sources that are used to replace non-linear devices may comprise waveforms that are the same as the replaced non-linear devices. As another example, generating the reduced power converter circuit model, via superposition, may comprise removing power sources that do not contribute to CM EMI noise.

In some embodiments, at step/operation 1704, the apparatus generates an impedance circuit model based on the reduced power converter circuit model. According to various embodiments of the present disclosure, an impedance circuit model is generated by converting a transformer component in a reduced power converter circuit model into a set of parallel transformer impedance branches, wherein each branch (i) comprises a respective transformer impedance and (ii) is connected in series with a respective noise source voltage. In some embodiments, generating an impedance circuit model further comprises converting one or more transformer primary side circuit components in a reduced power converter circuit model into a load impedance branch that comprises a load impedance. As such, the impedance circuit model may comprise a plurality of parallel transformer impedance branches (e.g., two) and a load impedance branch that is configured in parallel with the plurality of parallel transformer impedance branches and their respective noise source voltages.

In some embodiments, at step/operation 1706, the apparatus generates an impedance balanced circuit model based on the impedance circuit model. According to various embodiments of the present disclosure, generating an impedance balanced circuit model comprises inserting balance impedances into an impedance circuit model by coupling, for each transformer impedance branch in the impedance circuit model, a balance impedance branch (that comprises a balance impedance) in parallel with the transformer impedance branch thereby forming a transformer impedance-balance impedance pair. Generating an impedance balanced circuit model may comprise balancing an impedance circuit model by coupling balance impedances to transformer impedances (e.g., for each transformer impedance branch) in the impedance circuit model such that a plurality (e.g., all) of transformer impedance-balance impedance pairs that result from the coupling comprise a same total impedance value (e.g., the transformer impedance-balance impedance pairs comprise total impedance values that are equal, substantially equal, or substantially similar to each other) for an entirety of a desired frequency range.

In some embodiments, at step/operation 1708, the apparatus generates an RLC impedance balanced circuit model based on the impedance balanced circuit model. An RLC impedance balanced circuit model may comprise a transformation of transformer impedances into RLC branches. For example, RLC parameters of the transformer impedances may be extracted based on a CM impedance curve of a transformer represented by the impedance balanced circuit model (e.g., based on Equations 3 and 4). According to various embodiments of the present disclosure, generating an RLC impedance balanced circuit model comprises (i) converting each transformer impedance of an impedance balanced circuit model into an RLC branch and (ii) replacing the balance impedances (e.g., an entirety) of the impedance balanced circuit model with a single RLC balance branch that comprises the same serial resonant frequency as the transformer impedances to achieve impedance balance at capacitive region, resonance point, and inductive region. In some embodiments, an RLC branch comprises a resistor, an inductor, and a capacitor that are coupled in series with a noise source voltage. In some embodiments, an RLC balance branch is coupled in parallel with RLC circuit components (e.g., a resistor, an inductor, and a capacitor) that are associated with one of a plurality of RLC branches that comprises a lowest capacitance.

CONCLUSION

It should be understood that the examples and embodiments described herein are for illustrative purposes only and that various modifications or changes in light thereof will be suggested to persons skilled in the art and are to be included within the spirit and purview of this application.

Many modifications and other embodiments of the present disclosure set forth herein will come to mind to one skilled in the art to which the present disclosures pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claim concepts. Although specific terms are employed herein, they are used in a generic and descriptive sense only and not for purposes of limitation.

The invention claimed is:

1. An impedance balanced isolator converter circuit comprising:

a plurality of resistor, inductor, and capacitor (RLC) branches (i) that are representative of a transformer circuit component, (ii) that are coupled in series with a plurality of respective noise source voltages, and (iii) comprise RLC parameters that are based on respective ones of a plurality of impedances associated with the transformer circuit component;

a load impedance branch (i) that is representative of one or more transformer primary side circuit components and (ii) that is coupled in parallel with the plurality of RLC branches and the plurality of respective noise source voltages; and an RLC balance branch coupled in parallel with a first resistor, a first inductor, and a first capacitor that are associated with a first of the plurality of RLC branches.

2. The impedance balanced isolator converter circuit of claim 1, wherein the RLC balance branch comprises a serial resonant frequency of the first of the plurality of RLC branches.

3. The impedance balanced isolator converter circuit of claim 1, wherein the transformer circuit component is applied in one or more of a forward converter, a two inductors and a capacitor (LLC) converter, a full-bridge converter, or a push-pull converter.

4. The impedance balanced isolator converter circuit of claim 1, wherein the first of the plurality of RLC branches comprises a first capacitance that is less than a second capacitance of a second of the plurality of RLC branches.

5. The impedance balanced isolator converter circuit of claim 1, wherein the RLC balance branch comprises a balance capacitance equal to a difference between a second capacitance associated with a second of the plurality of RLC branches and a first capacitance associated with the first of the plurality of RLC branches.

6. A computer-implemented method comprising:

generating a reduced power converter circuit model based on an input power converter circuit model;

generating an impedance circuit model based on the reduced power converter circuit model;

generating an impedance balanced circuit model based on the impedance circuit model; and generating a resistor, inductor, and capacitor (RLC) impedance balanced circuit model based on the impedance balanced circuit model.

7. The computer-implemented method of claim 6, wherein generating the reduced power converter circuit model comprises replacing one or more non-linear devices of the input power converter circuit model with one or more power sources.

8. The computer-implemented method of claim 7, wherein generating the reduced power converter circuit model further comprises removing given ones of the one or more power sources that do not contribute to common mode electromagnetic interference noise.

9. The computer-implemented method of claim 6, wherein generating the impedance circuit model comprises converting a transformer component in the reduced power converter circuit model into a set of parallel transformer impedance branches, wherein a transformer impedance branch (i) comprises a transformer impedance and (ii) is coupled in series with a noise source voltage.

10. The computer-implemented method of claim 6, wherein generating the impedance circuit model comprises converting one or more transformer primary side circuit components in the reduced power converter circuit model into a load impedance branch that comprises a load impedance.

11. The computer-implemented method of claim 6, wherein generating the impedance balanced circuit model comprises coupling a balance impedance branch that comprises a balance impedance to each transformer impedance branch in the impedance circuit model.

12. The computer-implemented method of claim 6, wherein generating the impedance balanced circuit model comprises coupling, for each transformer impedance branch in the impedance circuit model, a balance impedance to the transformer impedance such that a plurality of transformer impedance-balance impedance pairs that result from the coupling comprise substantially similar total impedance values for a desired frequency range.

13. The computer-implemented method of claim 6, wherein generating the RLC impedance balanced circuit model comprises:

(i) converting a plurality of transformer impedances of the impedance balanced circuit model into a plurality of respective RLC branches; and (ii) replacing an entirety of balance impedances of the impedance balanced circuit model with an RLC balance branch that comprises a same serial resonant frequency as the plurality of transformer impedances.

14. The computer-implemented method of claim 13 further comprising coupling the RLC balance branch in parallel with a first resistor, a first inductor, and a first capacitor that are associated with one of the plurality of RLC branches that comprises a lowest capacitance.

15. One or more non-transitory computer-readable storage media including instructions that, when executed by one or more processors, cause the one or more processors to:

generate a reduced power converter circuit model based on an input power converter circuit model;

generate an impedance circuit model based on the reduced power converter circuit model;

generate an impedance balanced circuit model based on the impedance circuit model; and generate a resistor, inductor, and capacitor (RLC) impedance balanced circuit model based on the impedance balanced circuit model.

16. The one or more non-transitory computer-readable storage media of claim 15 further including instructions that, when executed by the one or more processors, cause the one or more processors to replace one or more non-linear devices of the input power converter circuit model with one or more power sources.

17. The one or more non-transitory computer-readable storage media of claim 15 further including instructions that, when executed by the one or more processors, cause the one or more processors to convert a transformer component in the reduced power converter circuit model into a set of parallel transformer impedance branches, wherein a transformer impedance branch (i) comprises a transformer impedance and (ii) is coupled in series with a noise source voltage.

18. The one or more non-transitory computer-readable storage media of claim 15 further including instructions that, when executed by the one or more processors, cause the one or more processors to convert one or more transformer primary side circuit components in the reduced power converter circuit model into a load impedance branch that comprises a load impedance.

19. The one or more non-transitory computer-readable storage media of claim 15 further including instructions that, when executed by the one or more processors, cause the one or more processors to couple a balance impedance branch that comprises a balance impedance to each transformer impedance branch in the impedance circuit model.

20. The one or more non-transitory computer-readable storage media of claim 15 further including instructions that, when executed by the one or more processors, cause the one or more processors to:

(i) convert a plurality of transformer impedances of the impedance balanced circuit model into a plurality of respective RLC branches; and (ii) replace an entirety of balance impedances of the impedance balanced circuit model with an RLC balance branch that comprises a same serial resonant frequency as the plurality of transformer impedances.

* * * * *